United States Patent [19]

Tanaka

[11] 3,997,382
[45] * Dec. 14, 1976

[54] METHOD OF AND APPARATUS FOR MANUFACTURING REINFORCED FLEXIBLE TUBES

[75] Inventor: Kenichi Tanaka, Musashino, Japan

[73] Assignee: Kakuichi Mfg. Co., Ltd., Ueda, Japan

[ * ] Notice: The portion of the term of this patent subsequent to Aug. 10, 1993, has been disclaimed.

[22] Filed: Apr. 15, 1974

[21] Appl. No.: 460,972

Related U.S. Application Data

[63] Continuation of Ser. No. 335,797, Feb. 26, 1973, abandoned.

[30] Foreign Application Priority Data

Feb. 29, 1972  Japan .............................. 47-20198
May 25, 1972  Japan .............................. 47-51946

[52] U.S. Cl. .............................. 156/167; 156/175; 156/244; 156/309; 156/391; 156/429; 156/446; 156/500; 264/173; 425/114; 425/131.1; 425/516

[51] Int. Cl.² .......................................... B65H 81/00

[58] Field of Search .......... 156/143, 173, 171, 184, 156/189, 195, 391, 392, 425, 432, 429, 431, 446, 466, 244, 500, 167, 175, 309; 425/500, 505, 516, 114, 131.1; 264/171, 173

[56] References Cited

UNITED STATES PATENTS

| | | | |
|---|---|---|---|
| 2,398,876 | 4/1946 | Bailey | 156/189 |
| 3,118,800 | 1/1964 | Snelling | 156/244 |
| 3,300,355 | 1/1967 | Adams | 156/189 |
| 3,706,624 | 12/1974 | Rinker | 156/432 |

Primary Examiner—Edward G. Whitby
Attorney, Agent, or Firm—Stevens, Davis, Miller & Mosher

[57] ABSTRACT

A method of manufacturing a reinforced flexible tube in which a hard synthetic resin spiral core is embedded in and fused to a soft synthetic resin matrix through the medium of a semi-hard synthetic resin adhesive layer and the apparatus for carrying out the method of manufacturing the tube. Hard and semi-hard synthetic resin materials are simultaneously extruded from extruders to form a first composite linear element in which these two separate materials are firmly bonded together owing to the small extruding temperature difference between these two separate materials. The first composite linear element is preheated to make the temperature difference between the linear element and a soft synthetic resin material to be extruded on the linear element small. Then, the soft synthetic resin material is extruded around the linear element to form a second composite linear element in which the small temperature difference between the linear element and the soft synthetic resin material causes these two materials to firmly bond each other. The second composite linear element is wound around at least three rotary shafts each arranged horizontally and rotatably journaled at its one end by a supporting frame and having along its free ends a splined portion, the centers of said rotary shafts being arranged at vertexes of a regular polygon, respectively. The rotary shafts are rotated such that at least three segmental sleeves each slidably fitted into said splined portion are selectively reciprocated.

10 Claims, 8 Drawing Figures

FIG_1A
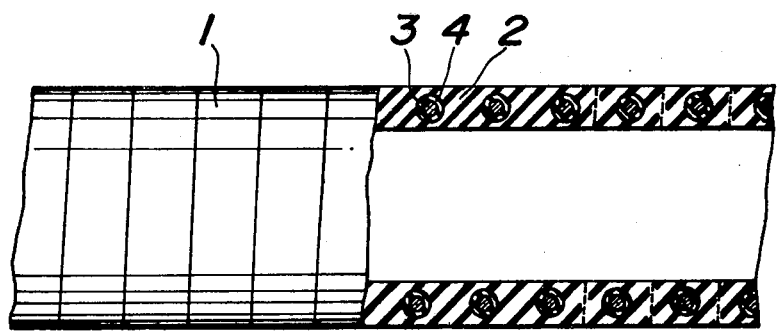
FIG_1B
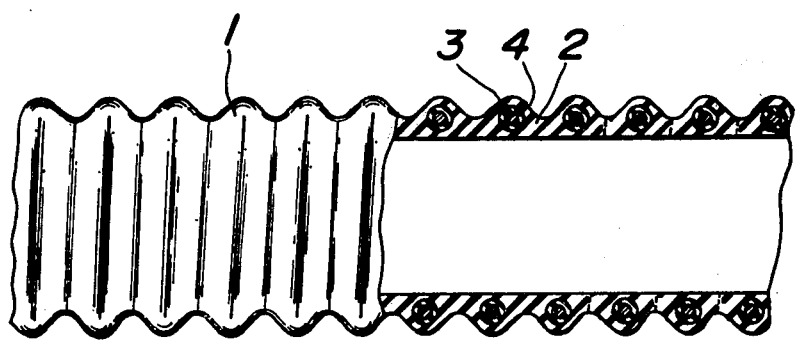

FIG_3
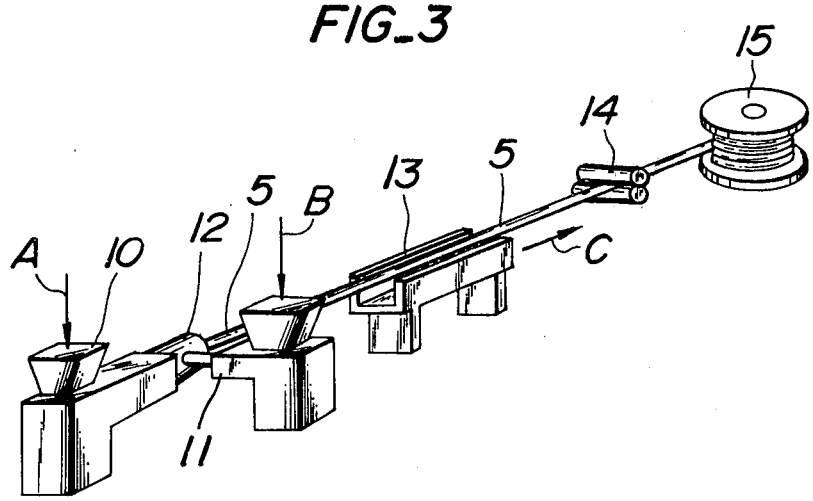
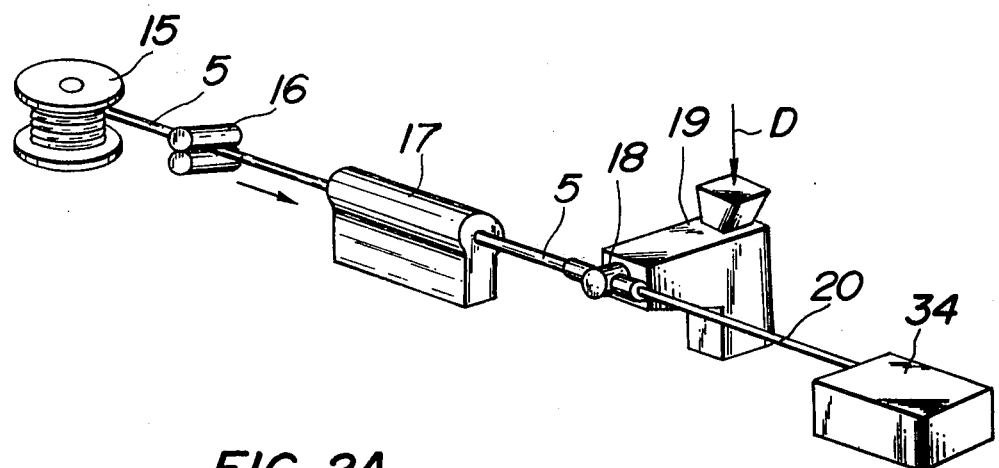
FIG_2A
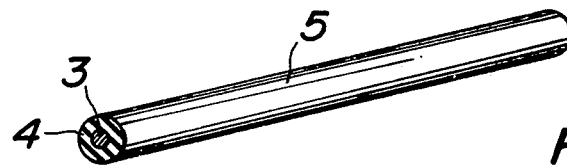
FIG_2B
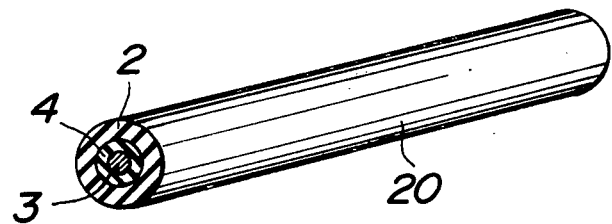

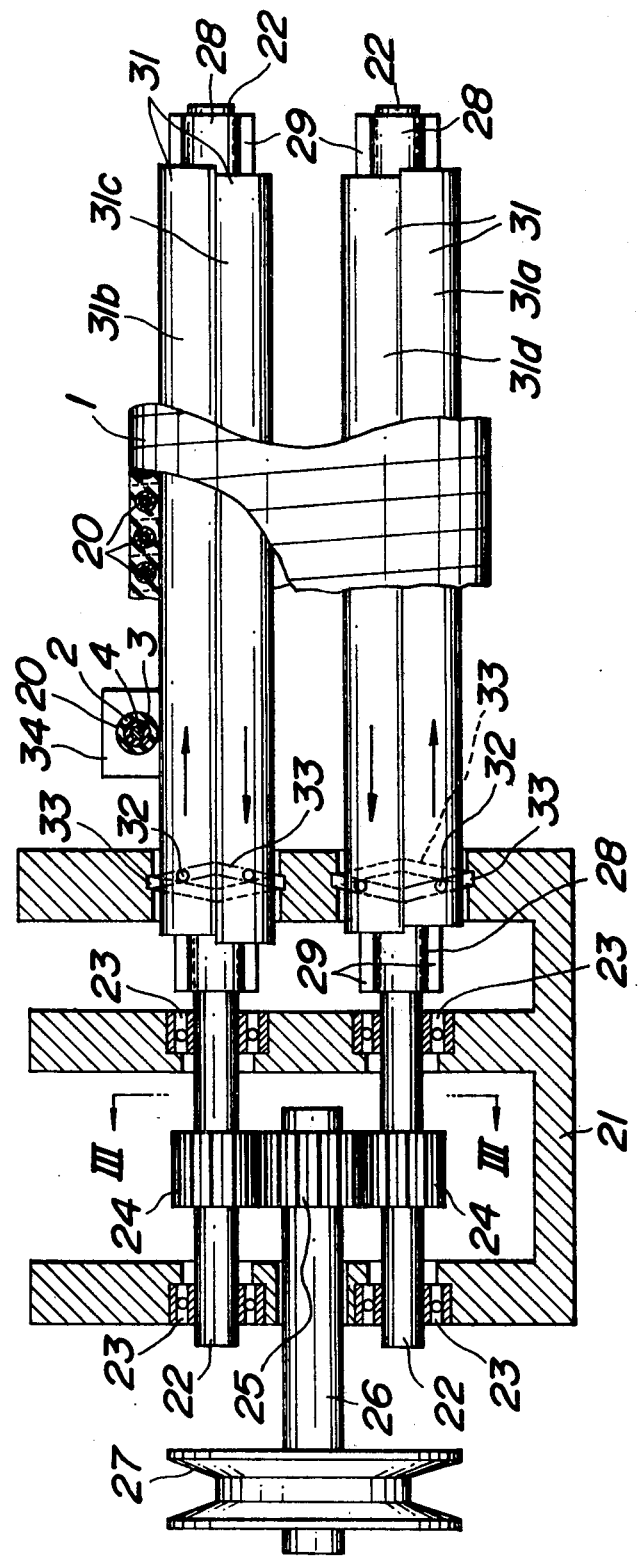

FIG_5
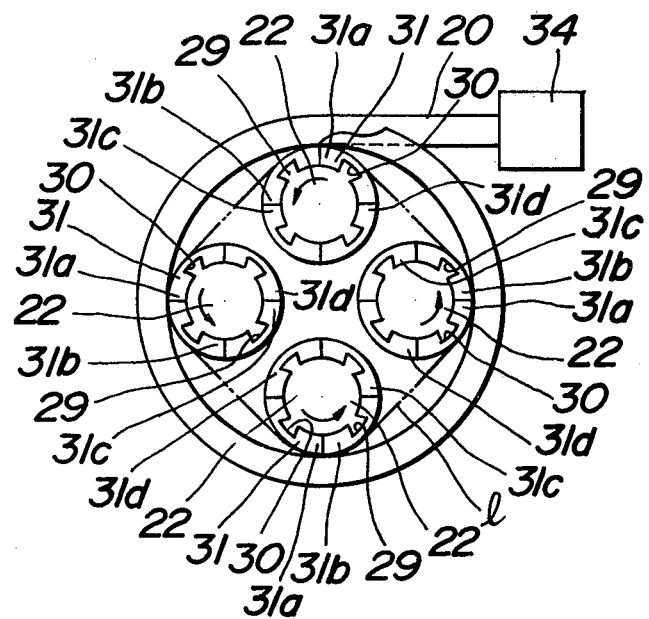
FIG_6
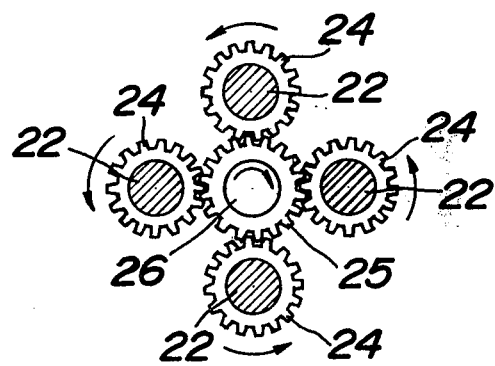

METHOD OF AND APPARATUS FOR MANUFACTURING REINFORCED FLEXIBLE TUBES

This is a continuation of application Ser. No. 335,797, filed 2-26-73 now abandoned.

This invention relates to a method of manufacturing a reinforced flexible tube comprising a soft synthetic resin matrix and a hard synthetic resin spiral core embedded in the matrix and fused thereto through the medium of a semi-hard synthetic resin adhesive layer and the apparatus for carrying out the method of manufacturing the tube.

Heretofore, a number of methods have been proposed to manufacture a reinforced flexible tube comprising a soft synthetic resin matrix and a hard synthetic resin spiral core embedded in the matrix and fused thereto. In one of these conventional methods, at first a hard synthetic resin material is extruded to form a reinforcing core and then a soft synthetic resin material is extruded around and fused to this reinforcing core to form a composite linear element which is then spirally wound around a mandrel to form a reinforced corrugated tube. This reinforced tube is finally removed from the mandrel to obtain a reinforced flexible tube. In the flexible tube thus obtained, the strength of the bond between the hard synthetic resin core and the soft synthetic resin matrix is on the order of, for example, about 60 Kg/cm$^2$ which is extremely small. If this reinforced flexible tube is deformed by being subjected to a heavy load, the bond between the two separate materials are separated one from the other, and as a result, becomes impossible to use it in practical fields.

In order to obviate the above mentioned disadvantage, a method of simultaneously extruding the hard and soft synthetic resin materials so as to form a reinforced flexible tube has been proposed. This alternative method makes it possible to increase the strength of the bond between the hard synthetic resin core and the soft synthetic resin matrix up to about 140 Kg/cm$^2$. However, in order to carry out such conventional method it is necessary to simultaneously operate two extruders for the purpose of extruding the two separate materials through a fixed head. In general, the hard synthetic resin material can be extruded at a temperature of about 180° C, and the soft synthetic resin material at a temperature of about 140° C. The temperature at which these two separate materials are extruded through the same head becomes about 160° C, and as a result, the soft synthetic resin material is denatured due to the increase of temperature from 140° C to 160° C, thereby decreasing its viscosity, while the decrease in temperature from 180° C to 160° C results in a decrease in the amount of extrusion of the hard synthetic resin material. Thus, the reinforced flexible tube becomes irregular in both form and dimension, and particularly the plasticizer contained in the soft synthetic resin material becomes gaseous due to the temperature rise from 140° C to 160° C to produce bubbles at the interface between the hard and soft synthetic resin materials. Moreover, it is difficult to coordinate the operating conditions of the two extruders in order to simultaneously extrude the two separate materials.

In the above mentioned conventional method, it is impossible to directly measure the dimensions of the hard synthetic resin material extruded continuously, and as a result, it is impossible to detect whether or not the extruder for extruding the hard synthetic resin material is normally operated. If the extruder is operated in an abnormal condition the reinforced flexible tube thus formed becomes irregular in both shape and dimension, and as a result, there is a risk of the flexible tube being broken during its practical use.

An object of the invention is to provide an improved method of and apparatus for manufacturing a reinforced flexible tube, which is capable of obviating the above mentioned various disadvantages encountered by the conventional methods and of producing a reinforced flexible tube whose strength of the bond between the hard and soft synthetic resin materials is significantly improved.

A feature of the invention is the provision of an improved method of manufacturing a reinforced flexible tube in which a hard synthetic resin core is embedded in and fused to a soft synthetic matrix through the medium of a semi-hard synthetic resin adhesive layer, comprising simultaneously extruding the hard synthetic resin material and the semi-hard synthetic resin material which act as adhesives so as to cover said hard synthetic resin material with said semi-hard synthetic resin to form a first composite linear element, preheating said linear element, extruding the soft synthetic resin material around said linear element to form a second composite linear element, supplying said second composite linear element onto one of at least three rotary shafts arranged to define the inner periphery of a tube to be manufactured and adhering thereto, rotating each rotary shaft about its own axis, and moving that portion of each rotary shaft which is positioned at the outside thereof forward by a given pitch and simultaneously moving that portion of each rotary shaft which is positioned at the inside thereof backward by the same pitch with successive turns of said second composite linear element in contact side by side and fused together to form a reinforced flexible tube.

Another feature of the invention is the provision of the apparatus for carrying out the method of manufacturing a reinforced flexible tube as claimed in claim 1, comprising in combination two extruders for separately extruding hard and semi-hard synthetic resin materials into two starting linear elements, respectively; a crosshead die common to said two extruders and for simultaneously extruding said two starting elements so as to cover a hard synthetic core with a semi-hard synthetic adhesive layer and form a first composite linear element, a preheater for preheating said first composite linear element, an extruder for extruding a soft synthetic resin material into a third linear element, an extruding die of said extruder for extruding said third linear element onto said first composite linear element so as to cover the latter with said third linear element and form a second composite linear element, a supporting frame, at least three rotary shafts each arranged horizontally and rotatably journaled at its one end by said supporting frame and having along its free end a splined portion, the centers of said rotary shafts being arranged at vertexes of a regular polygon, respectively, means to rotate said rotary shafts at the same speed in the same direction, at least three segmental sleeves each having a groove into which the ridge of said splined portion fits slidably, means to guide the segmental sleeves in a manner such that each segmental sleeve which makes contact with an envelope that is tangent to the segmental sleeves moves towards the free end of said rotary shaft and each segmental sleeve which does not make contact with said envelope moves towards the supported end of said rotary shaft, and a feeding device for supplying said second composite linear element to those portions of said segmental sleeve which are near said supporting frame whereby rotation of said rotary shafts at the same speed in the same direction and continuous supply of said second composite linear element produce a helical advance of said second composite linear element and thermal adherence of the lateral edges of the successive turns of the advancing second composite linear element in abutting relation to form an elongated tube.

The above and other objects, features and advantages of the invention will become more apparent from the following description and accompanying drawings, in which:

FIGS. 1A and 1B are side elevations in partly section of two embodiments of a reinforced flexible tube manufactured by the method and apparatus according to the invention;

FIG. 2A is an enlarged perspective view of a first composite element comprising a hard synthetic resin core and a semi-hard synthetic resin adhesive layer covered around the core;

FIG. 2B is an enlarged perspective view of a second composite linear element comprising the first composite linear element shown in FIG. 2A and a soft synthetic resin matrix covered around and fused to the first composite linear element;

FIG. 3 is a diagrammatic perspective view illustrating the successive steps of and devices for manufacturing the second composite linear element shown in FIG. 2B;

FIG. 4 is a front elevation and partly a sectional view four rotary shafts for forming an elongated tube from the second composite linear element shown in FIG. 2B, two of the rotary shafts being not shown for ease in illustration;

FIG. 5 is an end view of FIG. 4 seen from the right side thereof, the supporting frame being not shown for ease in illustration; and FIG. 6 is a section on line III-III of FIG. 4, the supporting frame being not shown.

Referring to FIGS. 1A and 1B, reference numeral 1 denotes a reinforced flexible tube manufactured by the method and apparatus according to the invention and comprising a soft synthetic resin matrix 2 and a hard synthetic resin spiral core 3 embedded in the matrix 2 and fused thereto through the medium of a semi-hard synthetic resin adhesive layer 4.

At first, the method of and apparatus for manufacturing the second composite linear element shown in FIG. 2B will be described with reference to FIGS. 2A, 2B, and 3.

At first, a hard synthetic resin material is fed into an extruder 10 as shown by an arrow A, while a semi-hard synthetic resin material is fed into an extruder 11 as shown by an arrow B. The hard synthetic resin material is kept at a temperature of about 180° C and extruded into a starting linear element (not shown), while the semi-hard synthetic resin material is kept at a temperature of about 170° C and extruded into another starting linear element (not shown). These two separate starting linear elements are simultaneously extruded through a crosshead die 12 common to the two extruders 10 and 11 so as to cover a hard synthetic resin core 3 with a semi-hard synthetic adhesive layer 4, thereby forming a first composite linear element 5 as shown in FIG. 2A. The diameter of the hard synthetic resin core 3 may preferably be on the order of about 3 mm to 12 mm, while the thickness of the semi-hard synthetic resin adhesive layer 4 may preferably be on the order of about 0.3 mm to 1 mm. When such linear elements 5 are formed by extrusion, use may be made of a hard thermoplastic resin material as the core 3 and a semi-hard thermoplastic resin material as the adhesive layer 4, which is harder than the soft synthetic resin material constituting the matrix 2, but softer than the hard synthetic resin material for constituting the core 3. As the semi-hard synthetic resin material for constituting the adhesive layer 4, use may preferably be made of a synthetic resin material having excellent transparency for ease of inspecting the formed condition of the core 3.

The linear element 5 extruded as above described is fed through a cooling tank 13 and a pair of feed rollers 14 in a direction shown by an arrow C to a reel 15 and wound around it.

The linear element 5 is then delivered from the reel 15 and fed through a pair of rollers 16 to a preheater 17 where the linear element 5 is preheated to a temperature of about 150° C. The linear element 5 thus preheated is fed to an extruding head 18 of an extruder 19.

A soft synthetic resin material for constituting the matrix 2 is then fed to the extruder 19 as shown by an arrow D and extruded into a linear element which is then extruded through the extruding head 18 onto the above mentioned linear element 5 and made integral therewith to form a second composite linear element 20 comprising the reinforcing core 3 embedded in the matrix 2 and fused thereto through the medium of the adhesive layer 4 as shown in FIG. 2B. As the soft synthetic resin matrix for constituting the matrix 2, use may be made of a soft thermoplastic resin material, such as vinyl chloride, polyethylene, etc. having oil resistance, chemical resistance, flexibility, etc. It is preferable to use vinyl chloride as all of the materials for constituting the core 3, adhesive layer 4 and matrix 2.

Now the method of forming an elongated tube from the second composite linear element 20 shown in FIG. 2B will be described with reference to FIGS. 4 to 6.

Referring to FIG. 4, reference numeral 21 designates a supporting frame for supporting four rotary shafts 22. Each rotary shaft 22 is arranged horizontally and the center axis thereof is positioned at the vertex of a square as shown in FIG. 5 and rotatably journaled in bearings 23 mounted in the supporting frame 21. To each rotary shaft 22 is secured a gear 24 which is engaged with a gear 25 secured to one end of a driving shaft 26 having another end with a pulley 27 secured thereto and adapted to be driven through a belt (not shown) by a motor (not shown). The driving shaft 26 with the gear 25 is positioned at the center of the square at whose vertexes are arranged the four rotary shafts 22 and the gears 24, respectively, and as a result, the rotation of the driving shaft 26 ensures the rotation of all of the rotary shafts 22 at the same speed in the same direction.

Each rotary shaft 22 is provided along its free end, that is, along that portion which is opposite to the portion supported by the supporting frame 21 with a splined portion 28 having four equidistant dove-tail ridges 29. The four dove-tail ridges 29 are slidably fitted in four grooves 30 formed in four segmental sleeves 31, respectively, so as to form a cylinder as a whole concentric with the rotary shaft 22 as shown in FIG. 5.

Each segmental sleeve 31 is provided at that portion which is supported by the supporting frame 21 with a pin 32 adapted to be slidably engaged with a rhombus-shaped groove 33 cut in the inner wall of the bore of the supporting frame 21. The pin 32 and the rhombus-shaped groove 33 form means for guiding the segmental sleeves 31.

The guide means 32, 33 is required to guide the segmental sleeves 31 in a manner such that each segmental sleeve 31a, 31b (FIG. 5) which makes contact with an envelope l that is tangent to the four segmental sleeves 31 moves towards the free end of the rotary shaft 22 and each segmental sleeve 31c, 31d which does not make contact with the envelope l moves towards the supported end of the rotary shaft 22. The guide means is not limited to the embodiment as above described, and use may be made of any modified guide means for satisfying the above mentioned requirements.

In FIGS. 4 and 5, reference numeral 34 designates a feeding device for supplying the second composite linear element 20 shown in FIG. 2B.

The apparatus constructed as above described will operate as follows.

If the driving shaft 26 is rotated in a clockwise direction shown by an arrow in FIG. 6, all of the rotary shafts 22 and segmental sleeves 31 are rotated in a counterclockwise direction shown by an arrow in FIGS. 5 and 6. Onto the rotating and forwards moving segmental sleeves 31a, 31b is supplied from the feeding device 34 the second composite linear element 20. The rotation of the segmental sleeves 31 causes the second composite linear element 20 supplied and adhered thereto to bend so as to surround the plurality of segmental sleeves 31 and rotate together with them. Those segmental sleeves 31a and 31b (FIG. 5) which make contact with the envelope l are moved forwards or towards the free ends of the rotary shafts 22, and as a result, the plastic pipe 1 being formed is also moved forwards (to the right in FIG. 4) and helically wound around the segmental sleeves 31. The segmental sleeves 31c and 31d which do not make contact with the envelope l are moved backwards or towards the supported ends of the rotary shafts 22. These segmental sleeves 31c and 31d are not in contact with the inner wall of the plastic pipe 1 being formed so that they can be moved backwards in a smooth manner without forming any strain at the butt joints formed by the adjacent lateral edges of the successive turns of the plastic pipe 1 being formed.

The width (pitch) of the plastic second composite linear element 20, the second composite linear element supplying speed from the feeding device 34, the rotating speed of the rotary shaft 22 and the forwards and backwards moving speeds of the segmental sleeves 31 are adjusted such that the successive turns of the plastic second composite linear element 20 are caused to be joined at the lateral edges thereof as shown by dotted lines in FIGS. 1A, 1B and 4 and then thermally melted together to form a reinforced plastic pipe 1 as partly shown in FIGS. 1A, 1B and 4.

If the plastic second composite linear element supply speed from the feeding device 34 is made equal to the rotating speed of the plastic pipe 1 being formed, there is no risk of the plastic second composite linear element 20 being at first deformed into a square contour defined by the envelope l of the segmental sleeves 31 and then formed into a circular contour or conversely there is no risk of the plastic second composite linear element 20 being deformed from the circular contour into an irregular circle, which will produce strain at the joints between the successive turns of the plastic pipe 1. It may be clear that the above mentioned adjustment of the diameter of the plastic second composite linear element 20, the plastic second composite linear element supplying speed, the rotating speed of the rotary shafts 22 and the forwards and backwards movements of the segmental sleeves 31 may easily be carried out by those skilled in the art.

As stated hereinbefore, the method and apparatus according to the invention make it possible to continuously manufacture an elongated reinforced plastic flexible pipe having a given pitch and outer and inner diameters. If it is desired to change the pitch or the diameter of the plastic pipe 1 formed, the pin-groove connection 32, 33 or the rotary shafts 22 may be replaced by new ones having desired dimensions or the supporting frame 21 may be modified so as to change the arrangement of the rotary shafts 22.

As described above, the method and apparatus according to the invention has the advantages that alternate forwards and backwards movements of the segmental sleeves 31 can be effected in an extremely smooth manner, and as a result, there is no danger of producing strain at the joints between the lateral edges of the successive turns of the semi-molten second composite linear element 20, so that a pipe 1 may continuously be manufactured.

The amount of the soft synthetic resin material to be extruded from the extruding head 18 may suitably be adjusted such that the thickness of the reinforced flexible tube 1 becomes on the order of 5 mm to 20 mm.

As explained hereinbefore, the provision of the semi-hard synthetic resin adhesive layer 4 between the hard synthetic resin core 3 and the soft synthetic resin matrix 2 makes it possible to remarkably increase the strength of the bond between the core 3 and the matrix 2 up to about 150 Kg/cm$^2$ to 180 Kg/cm$^2$. Moreover, a combination of the step of simultaneously extruding the hard and semi-hard synthetic resin materials so as to cover the core 3 with the adhesive layer 4 to form the first composite linear element 5 and the step of extruding the soft synthetic resin material around the outer periphery of the linear element 5 so as to cover the adhesive layer 4 with the matrix 2 to form the second composite linear element 20, is capable of eliminating the tendency for the plasticizer to produce gaseous bubbles in the interface between the soft and hard synthetic resin materials, and this eliminates a difficult problem which has been encountered with the conventional method of simultaneously extruding these two separate synthetic resin materials.

The use of the semi-hard synthetic resin material having good transparency as the adhesive layer 4 provides the important advantage that the dimension of the core 3 of the hard synthetic resin material can accurately be controlled, and that troubles arising from irregular dimensions of the hard synthetic resin core 3, which are frequently encountered, are completely obviated, and as a result, the final product having the desired accurate dimensions is obtained, which can be used in practice without risk of being broken.

Since the extruders 10 and 11 are operated at 180° C and 170° C, respectively, the temperature difference between the hard synthetic resin material and the semi-hard synthetic resin material extruded from these two extruders is so small that the compositions of the extruded linear element 5 are substantially uniform and regular. Moreover, the linear element 5 is preheated to about 150° C and around the linear element 5 thus preheated is extruded the soft synthetic resin material at about 140° C so that the temperature difference between the linear element 5 and the soft synthetic resin matrix 2 is also small such that the two separate materials are substantially uniformly bonded together and become regular in form and dimensions. Thus, the efficiency of the extruders is remarkably improved if compared with that of the extruders used in the conventional method.

If the first composite linear element 5 is directly fed to the preheater 17 without feeding it to the reel 15 as shown in FIG. 3, then the soft synthetic resin material can be extruded on the preheated first composite linear element 5 to form the second composite linear element 20 which can be formed into the reinforced flexible tube 1. Thus, the invention makes it possible to continuously manufacture a given length of the reinforced flexible tube 1.

The invention will now be described with reference to a practical example.

EXAMPLE

In the present example, use was made of the following materials.

| | |
|---|---|
| Hard material (Core): | |
| Vinyl chloride resin | 100 parts by weight |
| Stabilizer | 2 parts by weight |
| Semi-hard material (Adhesive layer): | |
| Vinyl chloride resin | 100 parts by weight |
| Plasticizer (Dioctyl phthalate abbreviated as DOP) | 25 parts by weight |
| Stabilizer | 2 parts by weight |
| Soft material (Matrix): | |
| Vinyl chloride resin | 100 parts by weight |
| Plasticizer (DOP) | 60 parts by weight |
| Stabilizer | 2 parts by weight |
| Coloring agent | 1 part by weight |

The above mentioned hard material was fed to the extruder 10, while the above mentioned semi-hard material was fed to the extruder 11. These two separate materials were maintained in the extruders 10 and 11 at different temperatures of about 180° C and 170° C, respectively, and simultaneously extruded through the crosshead die 12 to form a first composite linear element 5 comprising a core 3 having a diameter of about 5 mm and covered with an adhesive layer 4 whose thickness is about 0.5 mm. This composite linear element 5 was fed through the cooling tank 13 and feed rollers 14 to the reel 15 and wound about it.

Then, the composite linear element 5 was delivered from the reel 15 and fed through the rollers 16 to the preheater 17 where the composite linear element 5 was preheated to about 150° C. The composite linear element 5 thus preheated was introduced into the extruding head 18 of the extruder 19.

The above mentioned soft material was fed to the extruder 19 and then extruded at about 140° C from the extruding head 18 about the outer periphery of the composite linear element 5 and fused thereto, thereby forming the second composite linear element 20.

Then, the second composite linear element 20 was spirally wound about the four rotary shafts 22 whose opposite diameter is 50 mm with the successive turns arranged side by side to form the reinforced flexible tube 1 having an inner diameter of 50 mm as shown in FIGS. 1A and 1B.

The strength of the bond between the hard and soft materials bonded through the intermediary of the semi-hard material of the flexible tube according to the invention was 170 Kg/cm$^2$. This bond strength of 170 Kg/cm$^2$ was far superior to the strength of the bond between the hard and soft materials of the conventional flexible tube manufactured by simultaneously extruding these two separate materials, which is 140 Kg/cm$^2$, and the strength of the bond between the hard and soft materials of the conventional tube manufactured by first extruding the hard material and second extruding the soft material about the outer periphery of the hard material and fusing thereto, which is about 60 Kg/cm$^2$.

The embodiment of the invention shown in the drawings is for the purpose of describing the objects and features of the present invention. It is to be understood, however, that modifications, changes and alterations may be made without departing from the scope and spirit of the invention.

What is claimed is:

1. A method of manufacturing a reinforced flexible tube in which a hard synthetic resin core is embedded in and applied to a soft synthetic resin matrix through the medium of a semi-hard synthetic resin adhesive layer, comprising: simultaneously extruding hard synthetic resin material and semi-hard synthetic resin material to cover said hard synthetic resin material with said semi-hard synthetic resin material to form a first composite elongate element, preheating said first elongate element, extruding soft synthetic resin material around said first elongate element to form a second composite elongate element, continuously tangentially supplying said second composite elongated element onto one of a plurality of at least three parallel, axially segmented rotary shafts arranged to be internally tangential to a tube to be manufactured thereon, rotating each rotary shaft about its own axis, and moving in a forward direction at least one segment of each rotary shaft which is positioned internally tangential to said tube by a given pitch distance and simultaneously moving in a backward direction at least one segment of each rotary shaft which is positioned non-tangential to said tube by the same pitch distance, thereby spirally winding said second composite element in successive turns around said rotary shafts, said successive turns being in contact side by side, fusing said successive turns together thereby forming in said forward direction said reinforced flexible tube.

2. The method of claim 1 wherein each of said shafts is rotated so that their peripheries travel at the same speed.

3. The method of claim 1 wherein the centers of said shafts are arranged at vertexes of a regular polygon.

4. The method of claim 3 wherein said hard synthetic resin core is of a diameter of about 3 to about 12 mm.

5. The method of claim 1 wherein the thickness of said semi-hard synthetic resin material is about 0.3 to about 1 mm.

6. The method of claim 1 wherein said hard synthetic resin comprises vinyl chloride resin, said semi-hard synthetic resin comprises plasticized vinyl chloride resin, and said soft synthetic resin comprises further plasticized vinyl chloride resin.

7. The method of claim 6, wherein said hard synthetic resin is extruded at a temperature about 180° C and said semi-hard synthetic resin is extruded at a temperature of about 170° C.

8. The method of claim 7 wherein said second composite elongate element is cooled before being preheated.

9. The method of claim 8 wherein said second composite element is preheated to a temperature of about 150° C before said soft synthetic material is extruded around said second element.

10. The method of claim 7 wherein said soft synthetic resin is extruded at a temperature of about 140° C.

* * * * *